(12) United States Patent
Seki

(10) Patent No.: US 7,813,272 B2
(45) Date of Patent: Oct. 12, 2010

(54) DATA TRANSMISSION SYSTEM AND METHOD TRANSMITTING CHANNEL QUALITY INDICATORS IN VARIABLE FORMAT

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 751 days.

(21) Appl. No.: 11/298,454

(22) Filed: Dec. 12, 2005

(65) Prior Publication Data

US 2007/0070956 A1 Mar. 29, 2007

(30) Foreign Application Priority Data

Sep. 29, 2005 (JP) ............... 2005-285508

(51) Int. Cl.
H04J 1/16 (2006.01)
(52) U.S. Cl. .................... 370/229
(58) Field of Classification Search ......... 370/229, 370/468, 235, 310, 328, 329, 431, 437, 441, 370/464, 465; 714/748–752
See application file for complete search history.

(56) References Cited

U.S. PATENT DOCUMENTS

| 7,124,343 | B2 * | 10/2006 | Moulsley et al. ............. 714/748 |
| 7,257,423 | B2 * | 8/2007 | Iochi ........................... 455/561 |
| 7,333,546 | B2 * | 2/2008 | Kim et al. ..................... 375/242 |
| 7,688,798 | B2 * | 3/2010 | Dottling et al. ............. 370/345 |
| 7,688,799 | B2 * | 3/2010 | Yamamoto ................. 370/345 |
| 2001/0024427 | A1 | 9/2001 | Suzuki |
| 2003/0185242 | A1 | 10/2003 | Lee et al. |
| 2004/0009767 | A1 | 1/2004 | Lee et al. |
| 2004/0067757 | A1 | 4/2004 | Fukui |
| 2004/0179493 | A1 | 9/2004 | Khan |
| 2005/0174982 | A1 * | 8/2005 | Uehara et al. ............... 370/345 |
| 2005/0232156 | A1 | 10/2005 | Kim et al. |
| 2005/0276317 | A1 * | 12/2005 | Jeong et al. ................. 375/213 |
| 2006/0068825 | A1 * | 3/2006 | Iochi .......................... 455/522 |

FOREIGN PATENT DOCUMENTS

EP 1349292 10/2003

(Continued)

OTHER PUBLICATIONS

European Search Report dated Aug. 29, 2008 for corresponding International Application No. 05257489.4 1237/1770889.

(Continued)

Primary Examiner—Dmitry H Levitan
(74) Attorney, Agent, or Firm—Myers Wolin, LLC.

(57) ABSTRACT

A data transmission system capable of mitigating the load on an uplink (feedback channel). A transmitting station of the data transmission system includes a controller for controlling packet communication quality in accordance with a CQI derived based on a packet so that the packet communication quality may become highest, a packet generator for generating a packet, and a transmitter for transmitting the packet. A receiving station of the data transmission system includes a receiver for receiving the packet, a format changer for changing a CQI format in accordance with the communication quality of the received packet, a measuring unit for measuring the CQI based on the CQI format, and a transmitter for transmitting the measured CQI to the transmitting station.

12 Claims, 17 Drawing Sheets

FOREIGN PATENT DOCUMENTS

| | | |
|---|---|---|
| EP | 1388964 | 2/2004 |
| EP | 1564953 | 8/2005 |
| JP | 2001-238269 | 8/2001 |
| JP | 2003-169036 | 6/2003 |
| JP | 2004-134898 | 4/2004 |
| JP | 2004-135287 | 4/2004 |
| JP | 2004-282744 | 10/2004 |
| JP | 2005-057710 | 3/2005 |
| JP | 2005-521360 | 7/2005 |
| WO | 0041318 | 7/2000 |
| WO | 2005/076496 | 8/2005 |

OTHER PUBLICATIONS

Japanese Patent Office Action for corresponding Japanese Patent Application No. 2005-285508 issued on Feb. 16, 2010 with partial English translation.

European Patent Office, "Communication pursuant to Article 94(3) EPC" for corresponding European Patent Application No. 05 257 489.4, dated Oct. 30, 2009.

* cited by examiner

DATA TRANSMISSION SYSTEM AND METHOD TRANSMITTING CHANNEL QUALITY INDICATORS IN VARIABLE FORMAT

CROSS-REFERENCE TO RELATED APPLICATIONS

This application is based on, and claims priority to, Japanese Patent Application No. 2005-285508, filed Sep. 29, 2005, in Japan, and which is incorporated herein by reference.

BACKGROUND OF THE INVENTION

1. Field of the Invention

The present invention relates to systems and methods for data transmission, and more particularly, to data transmission system and method for exchanging packets including data channels.

2. Description of the Related Art

Generally, in cellular mobile communications, packets are transmitted by means of adaptive radio link control including control operations such as adaptive modulation, retransmission control and scheduling, in order to raise the transmission efficiency of data packets. These control operations are performed using a control channel transmitted simultaneously with a data channel, and a base station uses the control channel of a downlink (link from the base station to a mobile station) to notify a mobile station of the radio link parameters used in the data channel. In the case of the adaptive modulation, for example, the control channel carries information about the modulation type and encoding rate of the data channel. In the case of the retransmission control, the control channel carries information about the packet number of a packet being transmitted via the data channel, a retransmission count, etc., and in the case of the scheduling, the control channel conveys information about the mobile station (user) ID simultaneously with a packet.

The adaptive radio link control is performed in units of wireless resources such as time, frequency, and space (antenna or directional beam). The mobile station measures a parameter indicative of transmission channel quality, which is called CQI (Channel Quality Indicator), with respect to each of the wireless resources by using a pilot channel of the downlink, and feeds back the information to the base station by using the control channel of an uplink (link from the mobile station to the base station) (e.g., Unexamined Japanese Patent Publication No. 2004-135287). This Patent Document 1 proposes, in addition to the periodic feedback of the CQI, a method of feeding back the CQI when NACK (Negative Acknowledgment) is returned. In Patent Document 1, the CQI is not fed back when ACK (Acknowledgment) is returned.

For the CQI, SIR (Signal-to-Interference power Ratio) is usually employed. SIR is calculated using a channel estimation value obtained from the pilot channel of a downlink, in the manner described below.

Provided the channel estimation value obtained from a k-th pilot is $h_k$, received power S, interference power I and SIR are obtained according to the following equations (1) to (4) using K pilot symbols:

$$S = \frac{1}{K}\sum_{k=1}^{K}|h_k|^2 \quad (1)$$

$$m = \frac{1}{K}\sum_{k=1}^{K}h_k \quad (2)$$

$$I = \frac{1}{K}\sum_{k=1}^{K}|h_k - m|^2 = \frac{1}{K}\sum_{k=1}^{K}|h_k|^2 - m^2 \quad (3)$$

$$SIR = S/I \quad (4)$$

In next-generation radio communication systems, the time domain is segmented into wireless resource units called packets, and control operations such as adaptive modulation and scheduling are performed with respect to individual packets. Also, next-generation radio communication systems adopt multi-carrier transmission called OFDMA (Orthogonal Frequency Division Multiple Access). In OFDMA, wireless resources are segmented into frequency units (subcarriers), and control operations such as adaptive modulation and scheduling are performed with respect to individual frequencies. Further, next-generation radio communication systems use spatially multiplexed transmission called MIMO (Multiple-Input Multiple-Output) in which a plurality of transmit/receive antennas are used for transmitting/receiving data independently of one another. In this case, control operations such as adaptive modulation and scheduling can be performed with respect to each antenna.

The units into which wireless resources are segmented are used in combination. Namely, wireless resources are segmented in the time domain into packets and, in the case of OFDMA, are segmented also in the frequency domain. Further, where MIMO is adopted, wireless resources are segmented with respect to the individual antennas. By segmenting wireless resources into small units in this manner, it is possible to optimize the control operations. Also, in the case of scheduling a plurality of mobile stations (users), higher user diversity gains can be obtained by segmenting wireless resources into smaller units.

Thus, in next-generation radio communication systems, the adaptive radio link control is performed with respect to individual wireless resource units, and in order to optimize the control operations and to obtain high user diversity gains, it is necessary that wireless resources should be segmented into small units.

However, if wireless resources are segmented into small units, the number of CQIs to be measured increases, which leads to an increase in the amount of CQI information to be fed back. As a result, the load on the uplink used to feed back such information to the base station increases, giving rise to the problem that the usage efficiency of the uplink lowers.

SUMMARY OF THE INVENTION

The present invention was created in view of the above circumstances, and an object thereof is to provide data transmission system and method capable of mitigating the load on an uplink (feedback channel).

To achieve the object, there is provided a data transmission system for exchanging packets each including a data channel. The data transmission system comprises a transmitting station and a receiving station. The transmitting station includes a controller for controlling packet communication quality in accordance with a CQI indicative of quality of a packet propagation path so that the packet communication quality may become highest, a packet generator for generating a packet, and a first transmitter for transmitting the packet. The receiving station includes a receiver for receiving the packet, a format changer for changing a CQI format in accordance with communication quality of the received packet, a measuring unit for measuring the CQI based on the CQI format, and a second transmitter for transmitting the measured CQI to the transmitting station.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, the invention applied to embodiments will be outlined, and then specific embodiments will be explained in detail.

Figure 1:
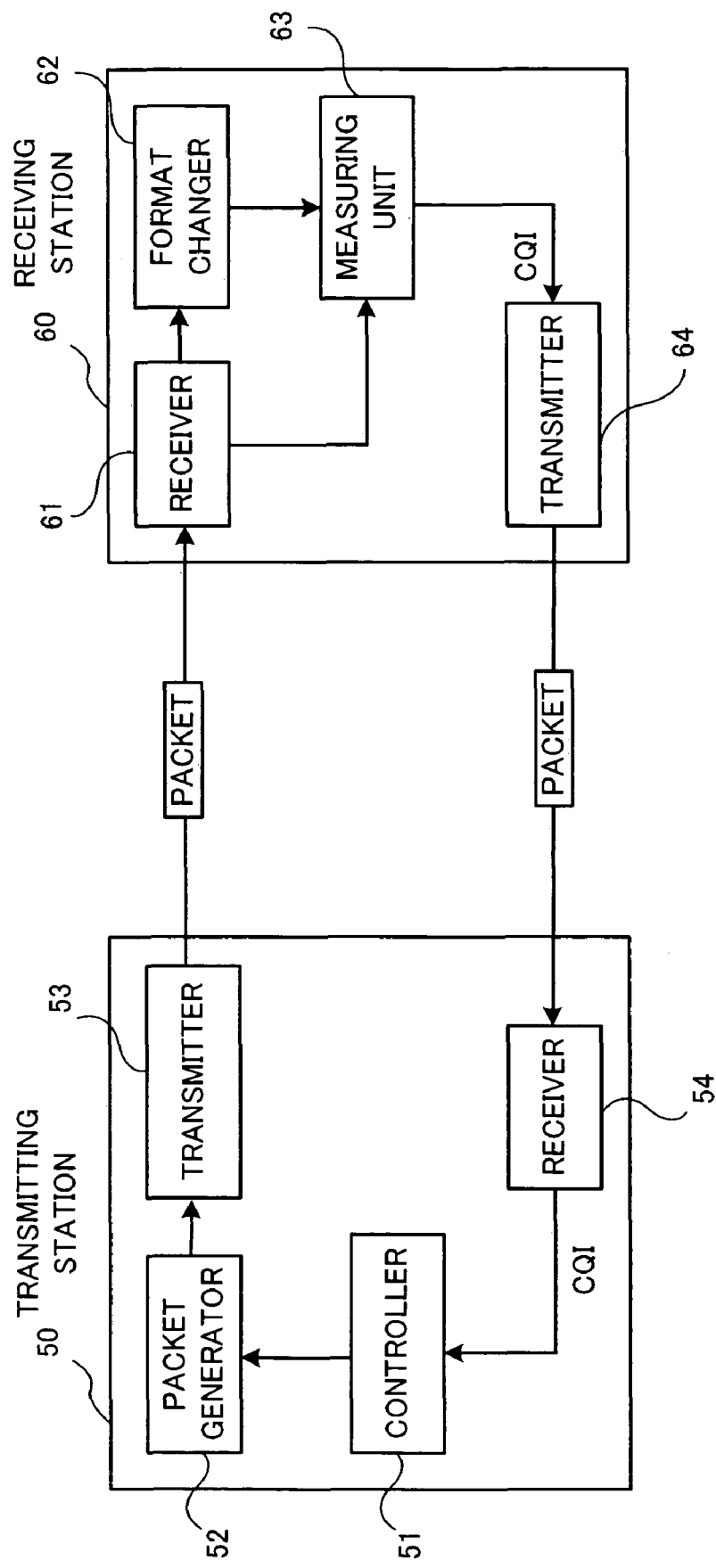
FIG. 1 illustrates the principle of a data transmission system.

FIG. 1 illustrates the principle of a data transmission system according to the present invention.

The data transmission system exchanges packets each including a data channel.

The data transmission system comprises a transmitting station 50 including a controller 51, a packet generator 52, a transmitter 53 and a receiver 54, and a receiving station 60 including a receiver 61, a format changer 62, a measuring unit 63 and a transmitter 64.

The controller 51 performs adaptive radio link control in accordance with a CQI indicative of the quality of a packet propagation path so that the packet communication quality may become highest. The adaptive radio link control includes, for example, adaptive modulation, retransmission control, and scheduling. Also, the adaptive radio link control is performed with respect to each packet.

The packet generator 52 generates a packet.

The transmitter 53 transmits the packet generated by the packet generator 52 to the receiving station 60.

The receiver 61 receives the packet sent from the transmitting station 50.

The format changer 62 changes a CQI format in accordance with the communication quality of the received packet.

The measuring unit 63 measures the CQI of the packet based on the CQI format.

The transmitter 64 transmits a packet including the measured CQI to the transmitting station 50.

The receiver 54 receives the packet sent from the receiving station 60.

Thus, the packet communication quality is controlled by the controller 51 in accordance with the CQI indicative of the quality of the packet propagation path so that the packet communication quality may become highest. Then, a packet is generated by the packet generator 52 and transmitted by the transmitter 53.

The packet is received thereafter by the receiver 61, and in accordance with the communication quality of the received packet, the CQI format is changed by the format changer 62. Then, based on the CQI format, the CQI of the packet is measured by the measuring unit 63, and the measured CQI is transmitted to the transmitting station 50 by the transmitter 64.

Thus, in accordance with the communication quality of the packet received by the receiver 61, the format changer 62 changes the format of the CQI to be transmitted to the transmitting station 50, whereby the load on the uplink can be mitigated.

Preferred embodiments of the present invention will be described below with reference to the accompanying drawings, wherein like reference numerals refer to like elements throughout.

Figure 2:
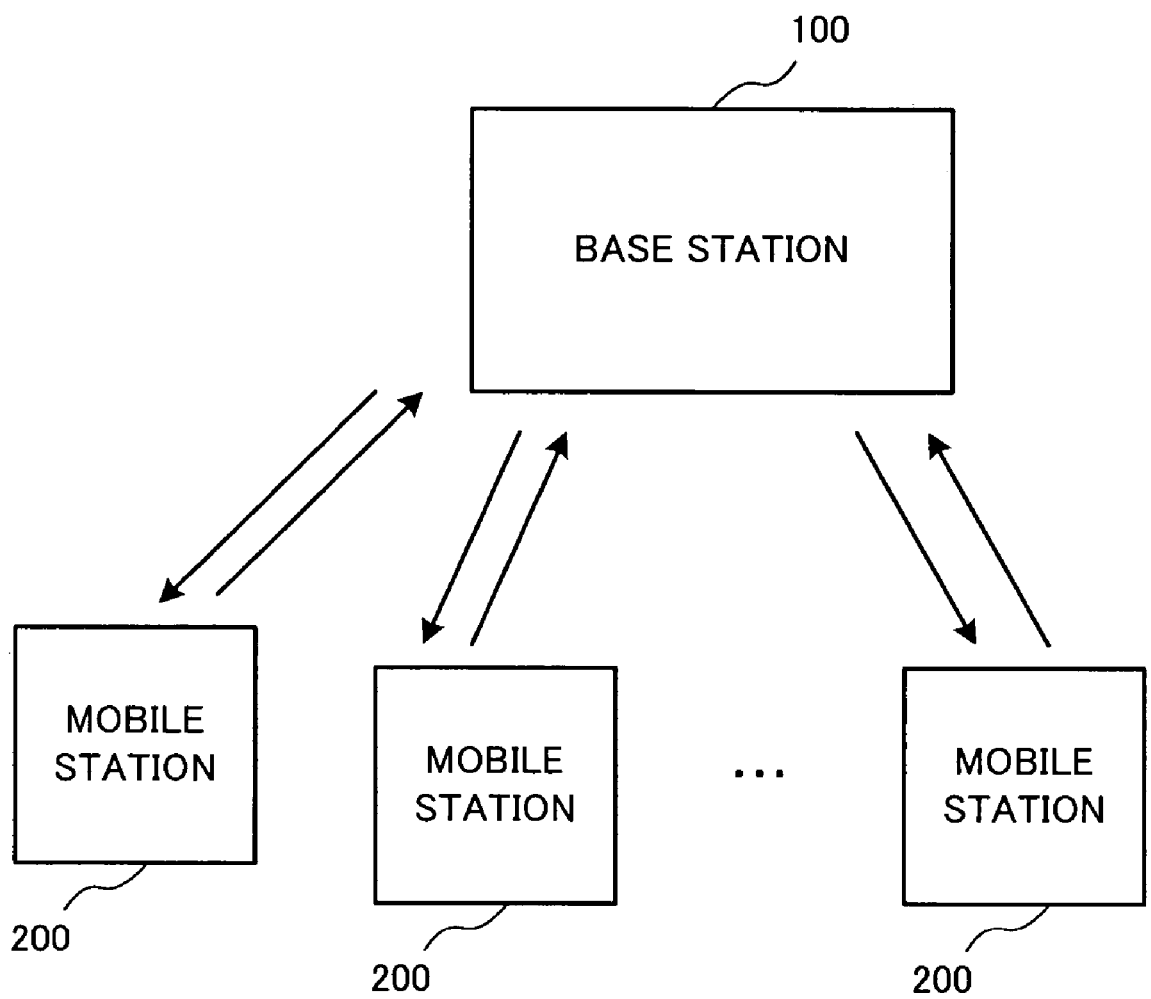
FIG. 2 is a block diagram schematically showing a data transmission system according to a first embodiment.

FIG. 2 is a block diagram schematically showing a data transmission system according to a first embodiment.

The data transmission system of this embodiment comprises a base station 100 and a plurality of (N) mobile stations 200 constituting a wireless network for exchanging packet-type data including a data channel and a control channel.

Each radio link is constituted by a downlink and an uplink. The downlink conveys data from the base station 100 to a mobile station 200, and the uplink conveys data in the opposite direction. In the following, the data channel and the control channel transmitted from the base station 100 to the mobile station 200 are referred to as "down data channel" and "down control channel", respectively, and the data channel and the control channel transmitted from the mobile station 200 to the base station 100 are referred to as "up data channel" and "up control channel", respectively. Further, since the multiple mobile stations 200 have an identical configuration, the following description is directed to data transmission between the base station 100 and one mobile station 200.

Figure 3:
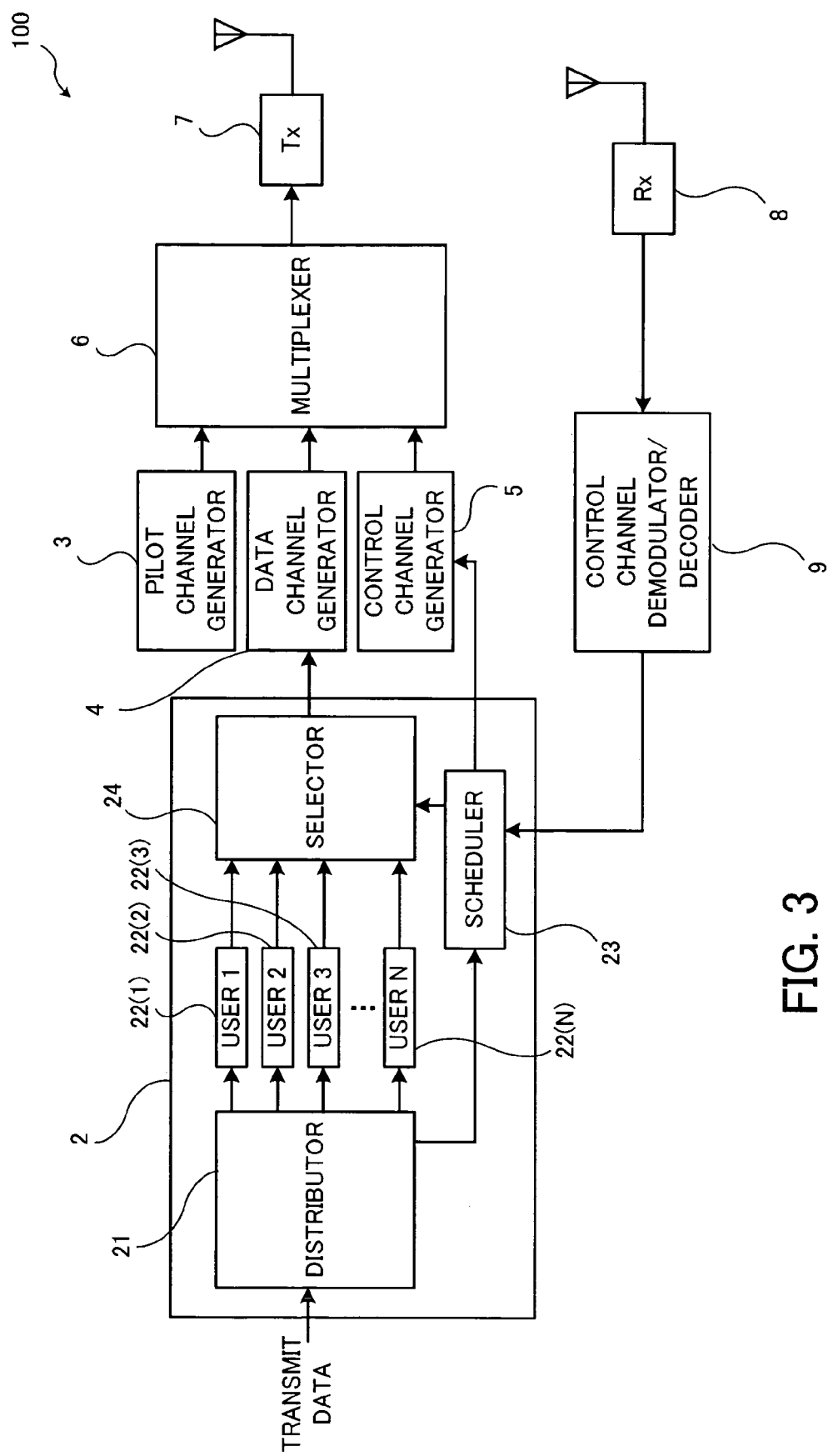
FIG. 3 is a block diagram showing a base station according to the first embodiment.

FIG. 3 is a block diagram showing the base station.

The base station 100 comprises a down traffic controller 2, a pilot channel generator 3, a data channel generator 4, a control channel generator 5, a multiplexer 6, a transmitter (Tx) 7, a receiver (Rx) 8, and a control channel demodulator/decoder 9.

The down traffic controller 2 is a part which takes care of the scheduling of the aforementioned adaptive radio link control and includes a distributor 21, buffers 22(1), 22(2), . . . , 22(N) corresponding in number to the mobile stations 200, a scheduler 23, and a selector 24.

The distributor 21 distributes transmit data received from a network (not shown) to the buffers 22(1), 22(2), ..., 22(N) to be stored in association with the respective mobile stations (users) 200.

The scheduler 23 schedules the transmission of data with respect to the mobile stations 200 in accordance with the amounts of traffic and priority levels of the individual mobile stations 200 and the CQIs and CQI formats obtained from the control channel demodulator/decoder 9. Also, in accordance with the CQIs, the scheduler 23 performs adaptive modulation for controlling the modulation types and encoding rates of respective data channels.

In accordance with instructions from the scheduler 23, the selector 24 fetches data for the specified mobile station (user) 200 from a corresponding one of the buffers 22(1), 22(2), ..., 22(N).

The pilot channel generator 3 generates a pilot channel.

The data channel generator 4 encodes and modulates the data for the mobile station 200 selected by the scheduler 23.

The control channel generator 5 generates a control channel based on the information obtained from the scheduler 23, more specifically, information about the assignment (user ID) of the selected user, modulation type, encoding rate, packet number, retransmission count, etc.

The multiplexer 6 multiplexes the encoded and modulated data for the mobile station 200 with the generated pilot and control channels to generate a packet 300.

Figure 4:
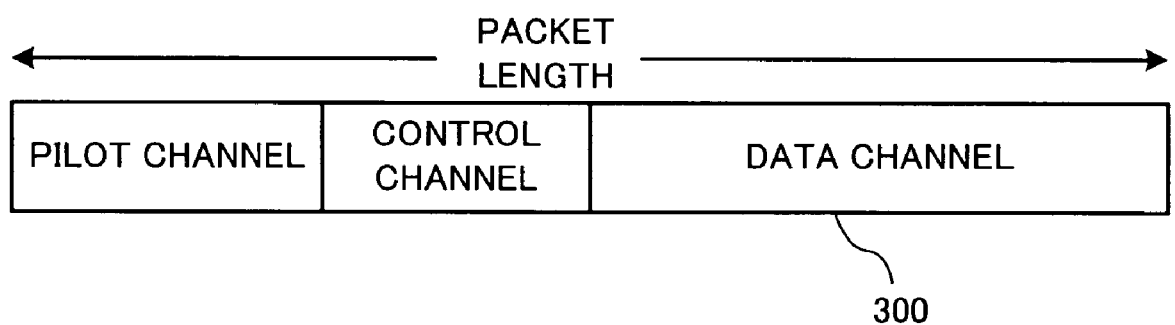
FIG. 4 exemplifies the structure of a packet transmitted over a downlink in the first embodiment.

FIG. 4 exemplifies the structure of the packet transmitted over the downlink in the first embodiment.

As illustrated, the packet 300 includes the "pilot channel", the "control channel", and the "data channel".

Referring again to FIG. 3, the transmitter 7 transmits the generated packet 300 to the corresponding mobile station 200.

The receiver 8 receives a packet transmitted from the mobile station 200.

The control channel demodulator/decoder 9 demodulates and decodes the control channel of the received packet to acquire information about the CQI and the CQI format sent from the mobile station 200, and outputs the acquired information to the scheduler 23.

Figure 5:
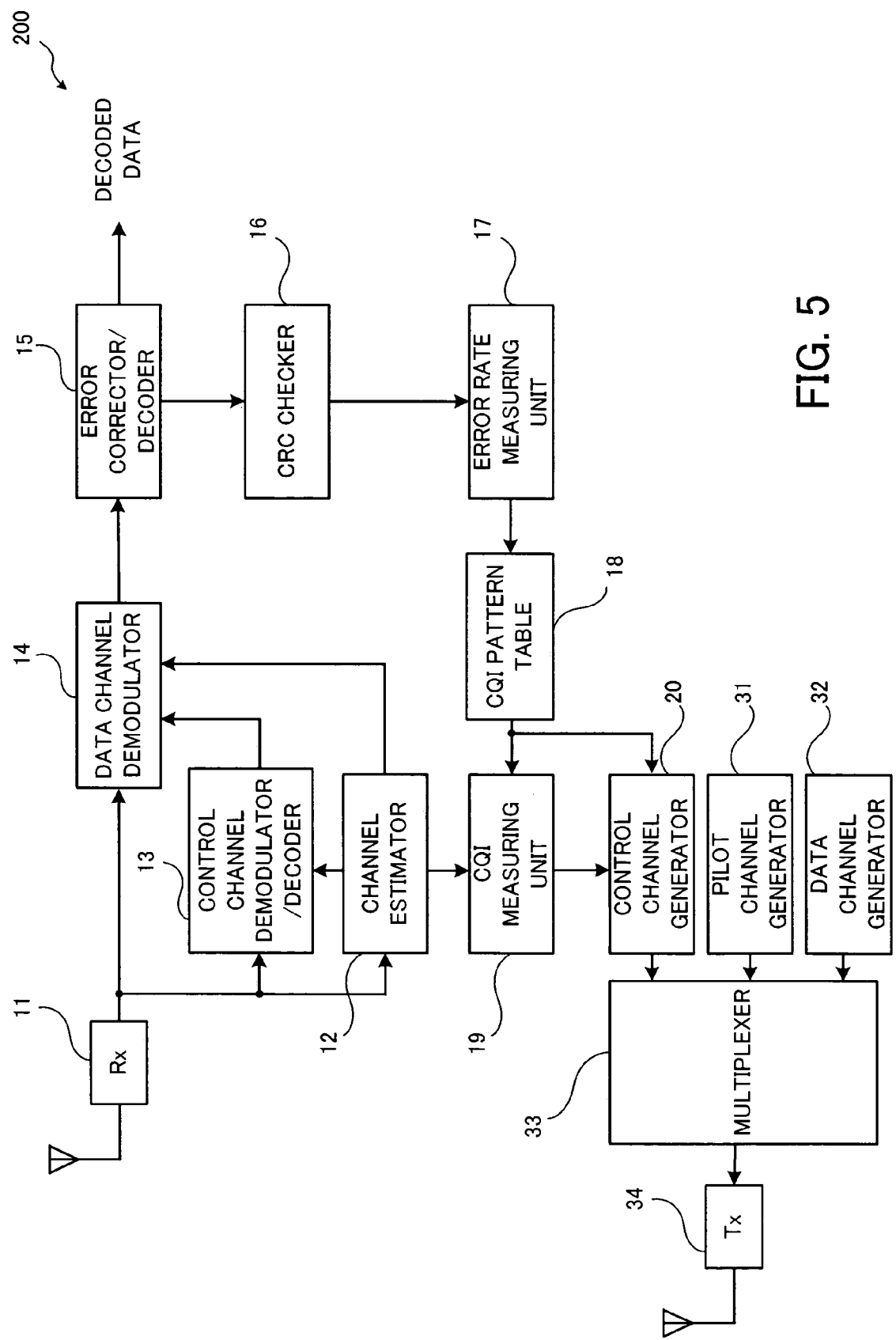
FIG. 5 is a block diagram showing a mobile station according to the first embodiment.

FIG. 5 is a block diagram showing the mobile station according to the first embodiment.

The mobile station 200 comprises a receiver (Rx) 11, a channel estimator 12, a control channel demodulator/decoder 13, a data channel demodulator 14, an error corrector/decoder 15, a CRC checker 16, an error rate measuring unit 17, a CQI pattern table 18, a CQI measuring unit 19, a control channel generator 20, a pilot channel generator 31, a data channel generator 32, a multiplexer 33, and a transmitter (Tx) 34.

Using the pilot channel of the packet 300 obtained via the receiver 11, the channel estimator 12 estimates the channel (propagation path) and generates a channel estimation value.

The control channel demodulator/decoder 13 demodulates and decodes the control channel of the packet 300 by using the channel estimation value.

Also, using the channel estimation value, the data channel demodulator 14 demodulates the data channel of the packet 300 to obtain demodulated data.

The error corrector/decoder 15 performs an error correction process on the demodulated data and generates decoded data.

The CRC checker 16 checks the decoded data for errors. Error check is performed by means of CRC (Cyclic Redundancy Check) attached to the encoded data channel.

The error rate measuring unit 17 averages the results obtained by the CRC checker 16 to measure the error rate and thus the communication quality of the down packet (data channel), and generates communication quality information.

The communication quality is measured by means of several indices such as BER (Bit Error Rate), BLER (Block Error Rate), ACK/NACK and retransmission count. In this embodiment, BLER is used.

The CQI pattern table 18 stores in advance a table of CQI formats associated with respective communication qualities. The CQI pattern table 18 selects a CQI format (changes the CQI format) in accordance with the communication quality information.

Figure 6A:
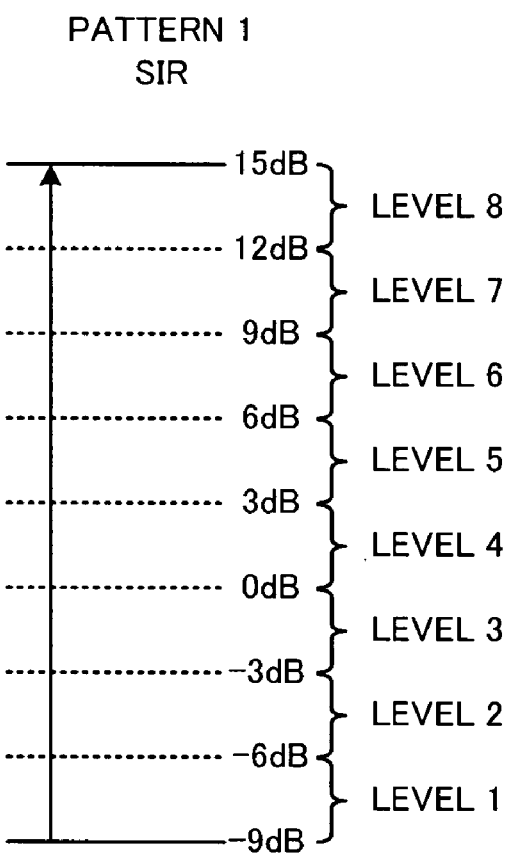
FIGS. 6A and 6B each exemplify a CQI format used in the first embodiment.
Figure 6B:
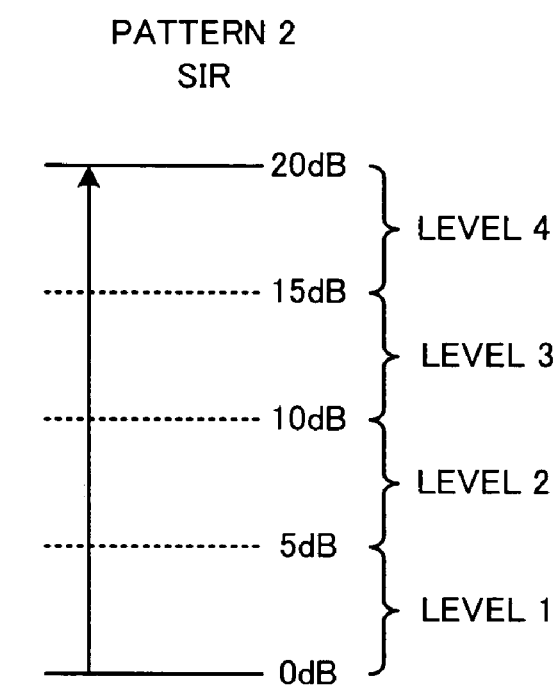

FIGS. 6A and 6B exemplify the CQI formats used in the first embodiment.

When the communication quality is poor, a CQI format (pattern 1) is selected wherein the range (evaluation range) from −9 to +15 dB, for example, is divided into eight 3-dB segments, as shown in FIG. 6A, so that 3-bit (level 1 to level 8) CQI information may be output. On the other hand, when the communication quality is good, a CQI format (pattern 2) is selected wherein the range from 0 to 20 dB, for example, is divided into four segments in 5 dB steps, as shown in FIG. 6B, so that 2-bit (level 1 to level 4) CQI information may be output.

Referring again to FIG. 5, the CQI measuring unit 19 calculates an SIR by using the channel estimation value generated by the channel estimator 12, and generates a CQI based on the calculated SIR and the CQI format.

The control channel generator 20 generates a control channel containing information about the generated CQI and the selected CQI format.

The multiplexer 33 multiplexes the control channel with the pilot and data channels generated respectively by the pilot channel generator 31 and the data channel generator 32, to generate a packet 400.

The transmitter 34 transmits (feeds back) the packet 400 to the base station 100 via the uplink.

Figure 7:
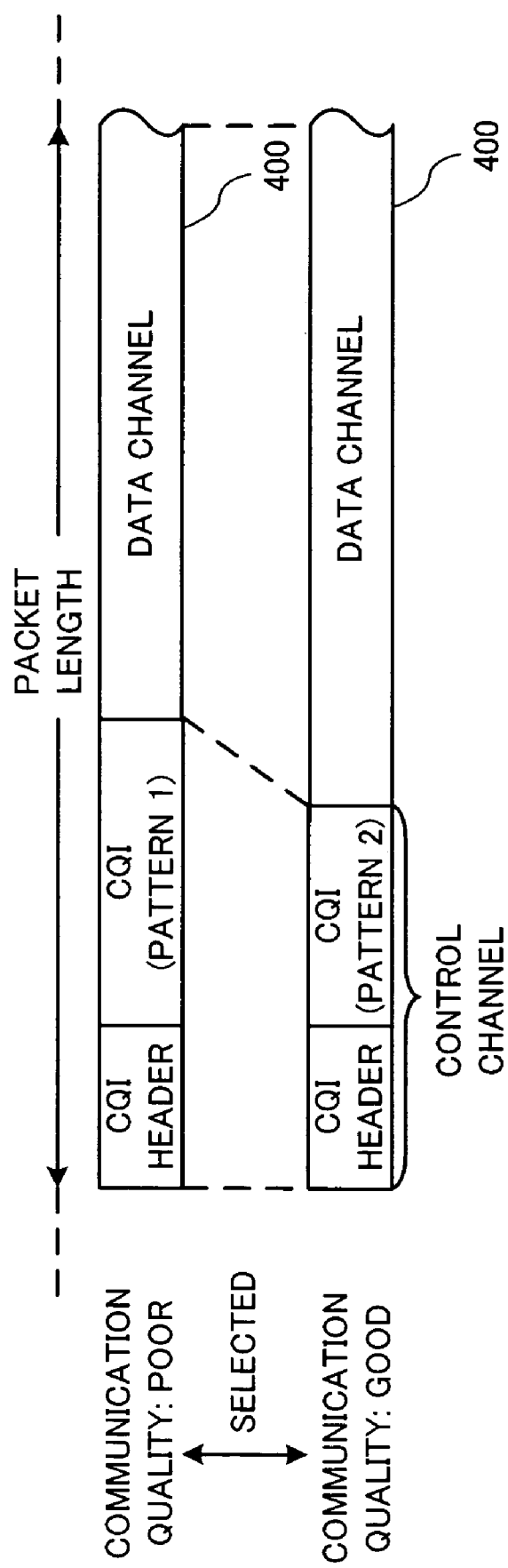
FIG. 7 exemplifies the structure of a packet transmitted over an uplink in the first embodiment.

FIG. 7 exemplifies the structure of the packet transmitted over the uplink in the first embodiment, wherein only part of packets is shown.

Each packet 400 has a "CQI header", the "CQI" and the "data channel" arranged in the order mentioned from the head thereof, as shown in FIG. 7.

The CQI header and the CQI are areas constituting the control channel, and the CQI header area holds the information about the CQI format. The CQI area holds the CQI measured by the mobile station 200.

The data channel area carries data traffic transmitted via the uplink. Although not specifically shown in FIG. 7, the data channel area may include the pilot and other control information as a part thereof. As seen from FIG. 7, when the communication quality is poor, that is, when a large amount of CQI information is transmitted, the amount of data transmitted by the data channel decreases. By increasing the amount of CQI information, however, it is possible to obtain higher gains by the adaptive radio link control, whereby the communication quality, and thus, the total throughput can be improved.

Operation of the data transmission system of the first embodiment will be now described.

First, at the base station 100, transmit data is stored in the buffers 22(1), 22(2), ..., 22(N) associated with the respective mobile stations 200. Then, in accordance with the amounts of traffic and priority levels of the individual mobile stations 200 and the CQIs transmitted from the respective mobile stations 200, the scheduler 23 schedules the transmission of data with respect to the mobile stations 200. Also, the scheduler 23 controls the modulation types and encoding rates of the data channels in accordance with the CQIs from the respective mobile stations 200. The data for the user selected by the scheduler 23 is encoded and modulated by the data channel generator 4, and the resultant data is multiplexed with the pilot and control channels by the multiplexer 6, thereby generating the packet 300. The generated packet 300 is transmitted from the transmitter 7 to the corresponding mobile station 200.

At the mobile station 200, the receiver 11 receives the packet 300, and the channel estimator 12 estimates the channel by using the pilot channel. The channel estimation value is used in the demodulation processes by the control channel demodulator/decoder 13 and the data channel demodulator 14, and is also output to the CQI measuring unit 19 to be used when obtaining an SIR and a CQI. The error corrector/decoder 15 performs an error correction process on the demodulated data obtained by the demodulation process, thereby obtaining decoded data. The decoded data is then checked for errors by the CRC checker 16. Subsequently, the error rate measuring unit 17 averages the CRC results to measure the error rate, and thus, determines the communication quality of the down data channel, thereby obtaining communication quality information. The CQI pattern table 18 selects a CQI format in accordance with the communication quality information, and then the CQI measuring unit 19 calculates a CQI based on the selected CQI format, thereby obtaining the CQI to be transmitted. The control channel generator 20 generates control information including the generated CQI and the CQI format. Subsequently, in the multiplexer 33, the control channel is multiplexed with the pilot and data channels generated respectively by the pilot channel generator 31 and the data channel generator 32, thereby generating the packet 400. The packet 400 is transmitted (fed back) from the transmitter 34 to the base station 100 via the uplink.

The packet 400 sent from the mobile station 200 is thereafter received by the receiver 8 of the base station 100 and the information about the CQI and the CQI format is acquired from the packet, whereupon the control channel demodulator/decoder 9 demodulates and decodes the control channel, and the scheduler 23 performs control operations, such as scheduling and adaptive modulation, in accordance with the CQI fed back thereto. The operation described above is repeatedly executed thereafter.

As described above, in the data transmission system of this embodiment, the adaptive radio link control is performed while changing the CQI evaluation range and the resolution of CQI evaluation levels in accordance with the communication quality of the down data channel, to generate the CQI pattern 1 with a large amount of information or the CQI pattern 2 with a small amount of information. This makes it possible to lessen the load on the uplink (feedback channel) without significantly lowering the throughput of the downlink. Further, by controlling the CQI feedback amount in accordance with the state of use of the uplink, it is possible to maintain high throughput of the downlink.

Also, in this embodiment, the CQI measured at the mobile station 200 is transmitted to the base station 100 via the control channel of the uplink, and it is therefore necessary for the base station 100 to identify the CQI format. By using the control channel of the uplink, it is possible to easily and reliably notify the base station of the CQI format according to which the mobile station 200 is transmitting the CQI.

In the above embodiment, both of the CQI evaluation range and the resolution of CQI evaluation levels are changed in accordance with the communication quality of the data channel, but only one of the two may be changed instead.

A data transmission system according to a second embodiment will be now described.

The following description is focused on the differences between the data transmission systems of the second and first embodiments, and description of the elements and functions common to the two embodiments is omitted.

The data transmission system of the second embodiment differs from the counterpart of the first embodiment in that an ACK/NACK signal, which is fed back to the base station for retransmission control, is used as information indicative of the communication quality of the down data channel, and comprises the base station 100 and a mobile station 200a.

Figure 8:
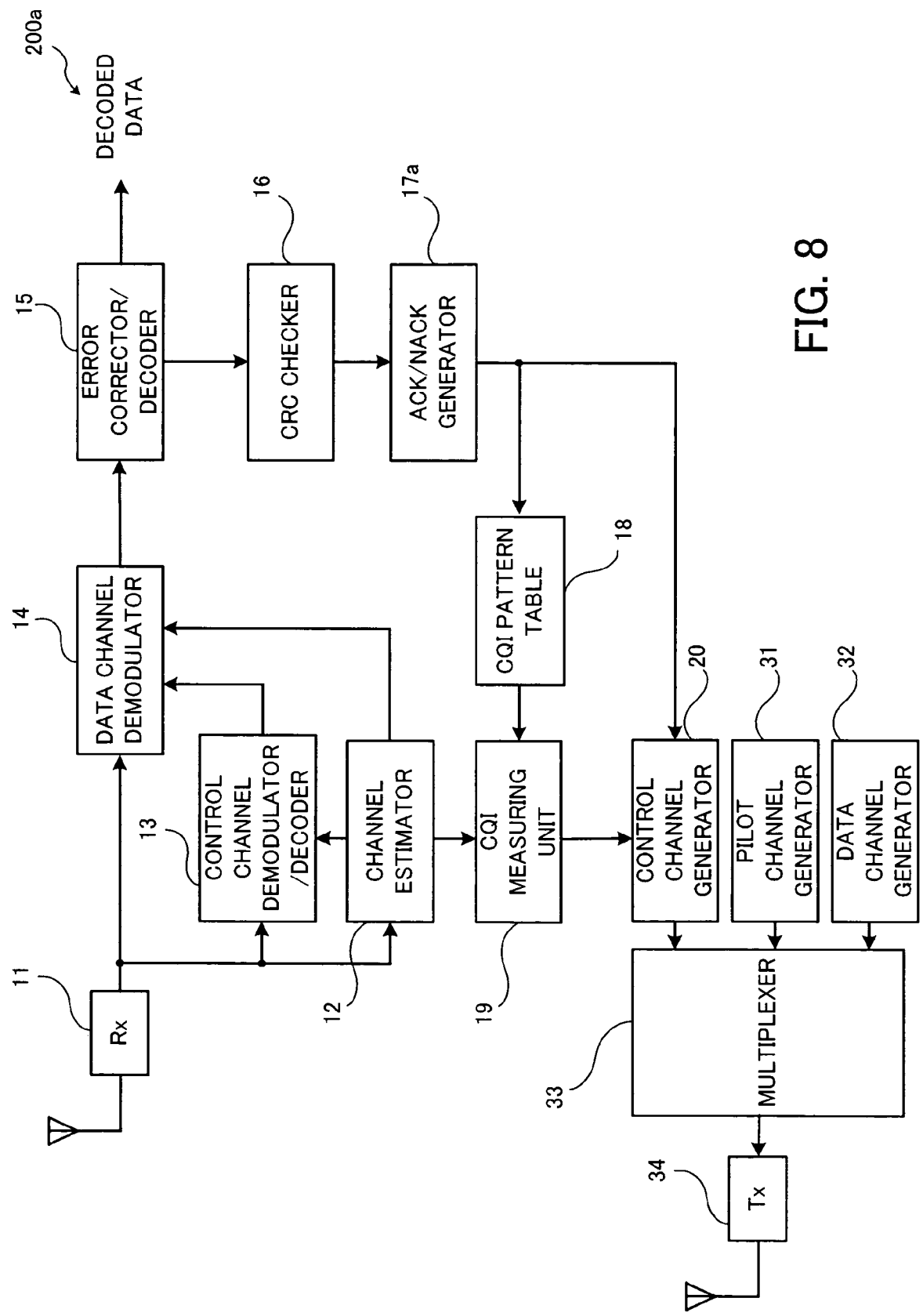
FIG. 8 is a block diagram showing a mobile station according to a second embodiment.

FIG. 8 is a block diagram showing the mobile station according to the second embodiment.

In the data transmission system of the second embodiment, retransmission control is performed, and the CQI format is selected in accordance with the ACK/NACK signal which is used for the retransmission control.

To this end, the mobile station 200a includes an ACK/NACK generator 17a for generating ACK/NACK information, in place of the error rate measuring unit 17. Also, the CQI pattern table 18 selects a CQI pattern based on the generated ACK/NACK signal.

Figure 9:
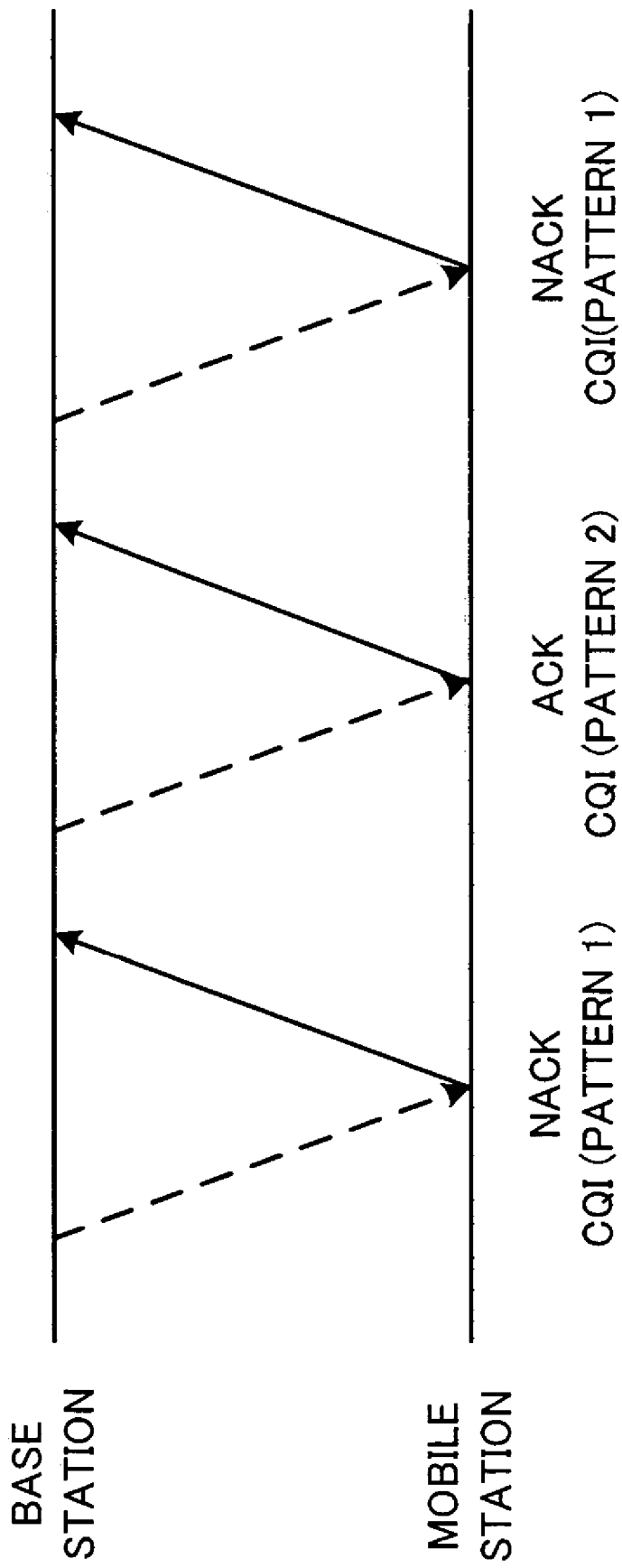
FIG. 9 illustrates a CQI format selection procedure used in the second embodiment.

FIG. 9 illustrates a CQI format selection procedure used in the second embodiment.

When the communication quality is poor, that is, when a NACK signal has been generated, the CQI pattern table 18 selects the format (pattern 1) with a large amount of CQI information. On the other hand, when the communication quality is good, that is, when an ACK signal has been generated, the format (pattern 2) with a small amount of CQI information is selected.

Referring again to FIG. 8, the control channel generator 20 generates a control channel including the generated CQI and the ACK/NACK signal.

The multiplexer 33 multiplexes the control channel with the pilot and data channels generated respectively by the pilot channel generator 31 and the data channel generator 32, thereby generating a packet 400a.

The transmitter (Tx) 34 transmits (feeds back) the packet 400a to the base station 100 via the uplink.

Figure 10:
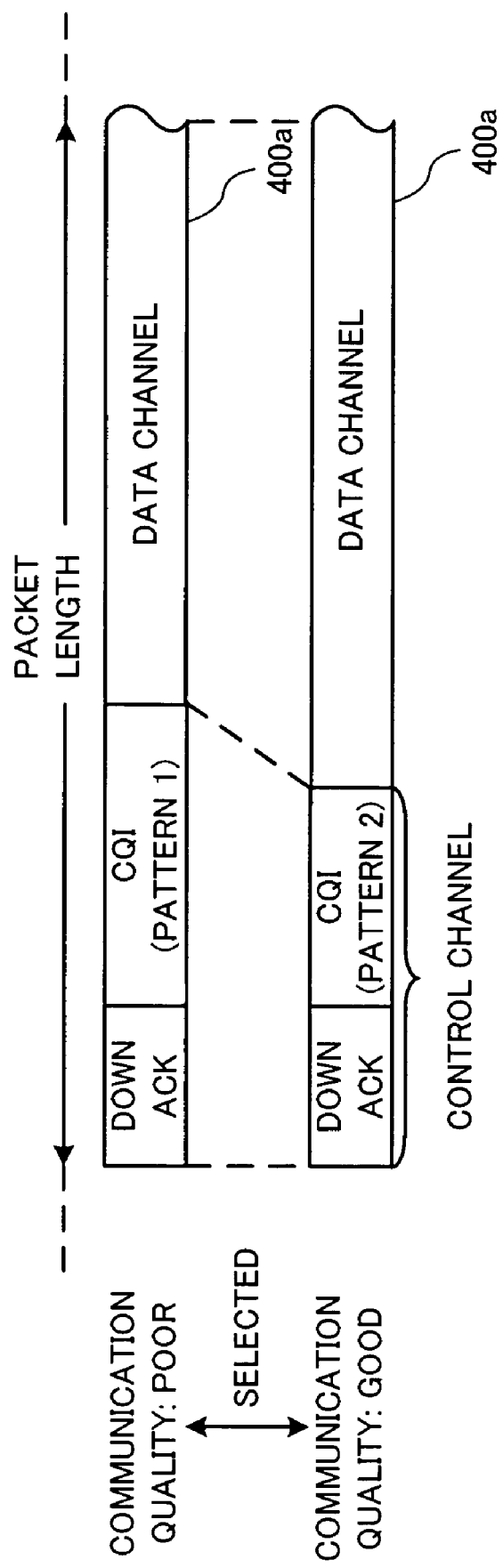
FIG. 10 exemplifies the structure of a packet transmitted over an uplink in the second embodiment.

FIG. 10 exemplifies the structure of the packet transmitted over the uplink in the second embodiment.

Each packet 400a has the "down ACK", the "CQI" and the "data channel" arranged in the order mentioned from the head thereof, as shown in FIG. 10.

The down ACK and the CQI are areas constituting the control channel, and the down ACK area carries the ACK/NACK signal related with the packet 300 transmitted via the downlink. More specifically, the mobile station 200a, to which the packet 300 has been allotted by the scheduler 23 of the base station 100, feeds back a down ACK/NACK signal after performing the predetermined process.

The data transmission system of the second embodiment can provide advantages similar to those achieved by the data transmission system of the first embodiment.

Further, in the data transmission system of the second embodiment, the retransmission control is performed while at the same time selecting the CQI format (changing the CQI transmission method) in accordance with the ACK/NACK information, thus making it unnecessary to notify the CQI format by means of the control channel of the packet 400a. Also, the error rate measuring unit 17 can be omitted and it is unnecessary to measure the error rate (downlink communication quality). The load on the uplink (feedback channel) can therefore be lessened by using a simple control procedure.

A data transmission system according to a third embodiment will be now described.

The following description is focused on the differences between the data transmission systems of the third and second embodiments, and description of the elements and functions common to the two embodiments is omitted.

The data transmission system of the third embodiment differs from the counterpart of the second embodiment in that the mobile station uses, as information indicative of the communication quality of the down data channel, a retransmission count which is notified from the base station 100 for the retransmission control, and comprises the base station 100 and a mobile station 200b.

Figure 11:
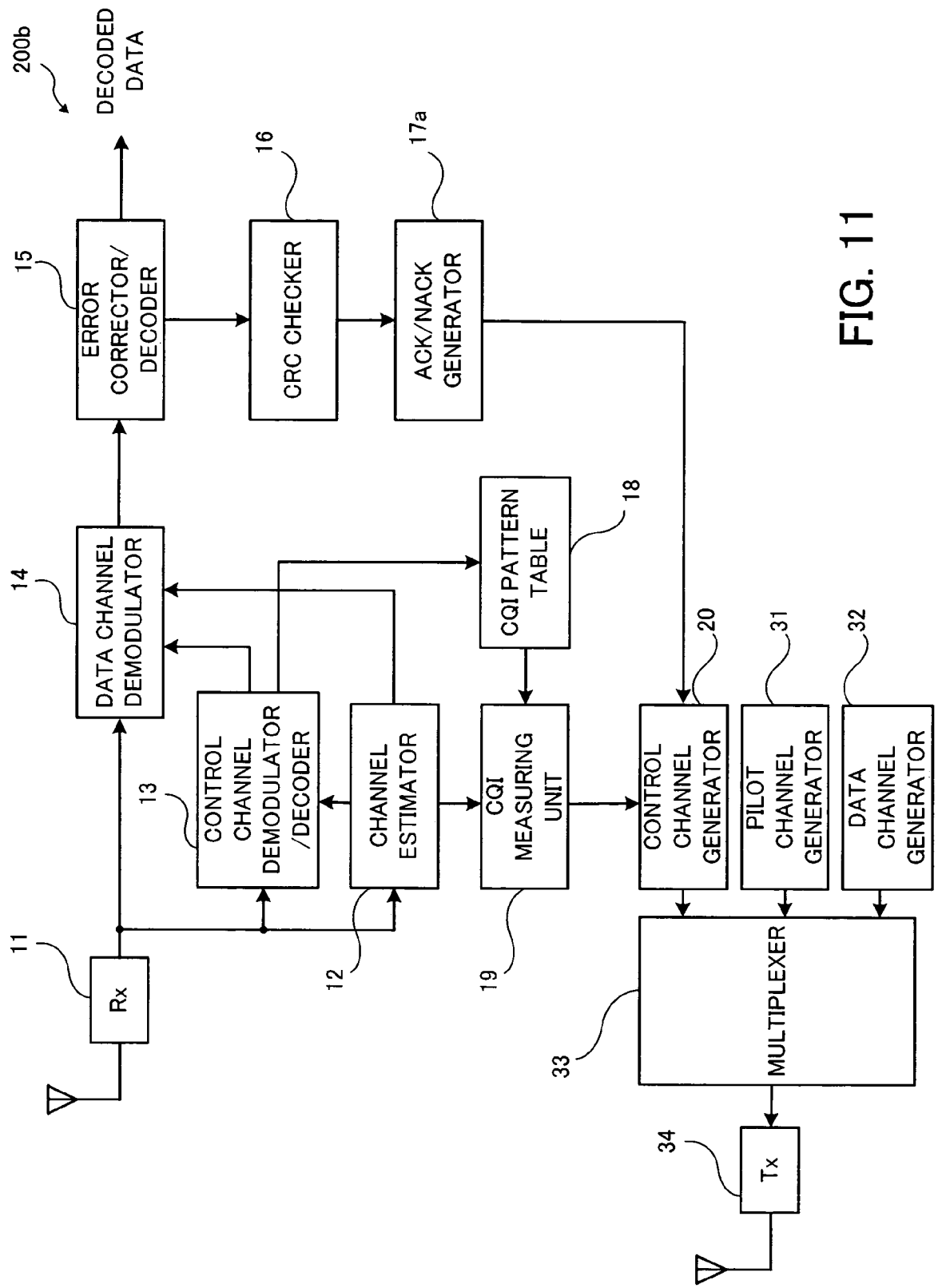
FIG. 11 is a block diagram showing a mobile station according to a third embodiment.

FIG. 11 is a block diagram showing the mobile station according to the third embodiment.

At the mobile station 200b, the control channel demodulator/decoder 13 acquires information about the retransmission count from the control channel of the received packet 300.

The CQI pattern table 18 selects a CQI format in accordance with the acquired information. Specifically, if the count of retransmissions from the base station 100 to the mobile station 200b is larger than or equal to N, it is judged that the communication quality is poor, in this case, the format with a large amount of CQI information is selected. On the other hand, if the count of retransmissions from the base station 100 to the mobile station 200b is smaller than N, it is judged that the communication quality is good, and in this case, the format with a small amount of CQI information is selected.

According to this embodiment, since the base station 100 holds information about the retransmission count, information about the CQI format need not be transmitted by means of the up control channel.

In the data transmission system of the third embodiment, the CQI format is determined in accordance with the retransmission count. Accordingly, it is unnecessary to notify the CQI format via the up control channel or to measure the communication quality of the downlink, thus providing the same advantages as those achieved by the data transmission system of the second embodiment.

A data transmission system according to a fourth embodiment will be now described.

The following description is focused on the differences between the data transmission system of the fourth embodiment and those of the first and third embodiments, and description of the elements and functions common to these embodiments is omitted.

The data transmission system of the fourth embodiment differs from the counterparts of the first and third embodiments in that the state of use of the uplink is employed as the criterion for selecting the CQI format, and comprises a base station 100a and a mobile station 200c.

Figure 12:
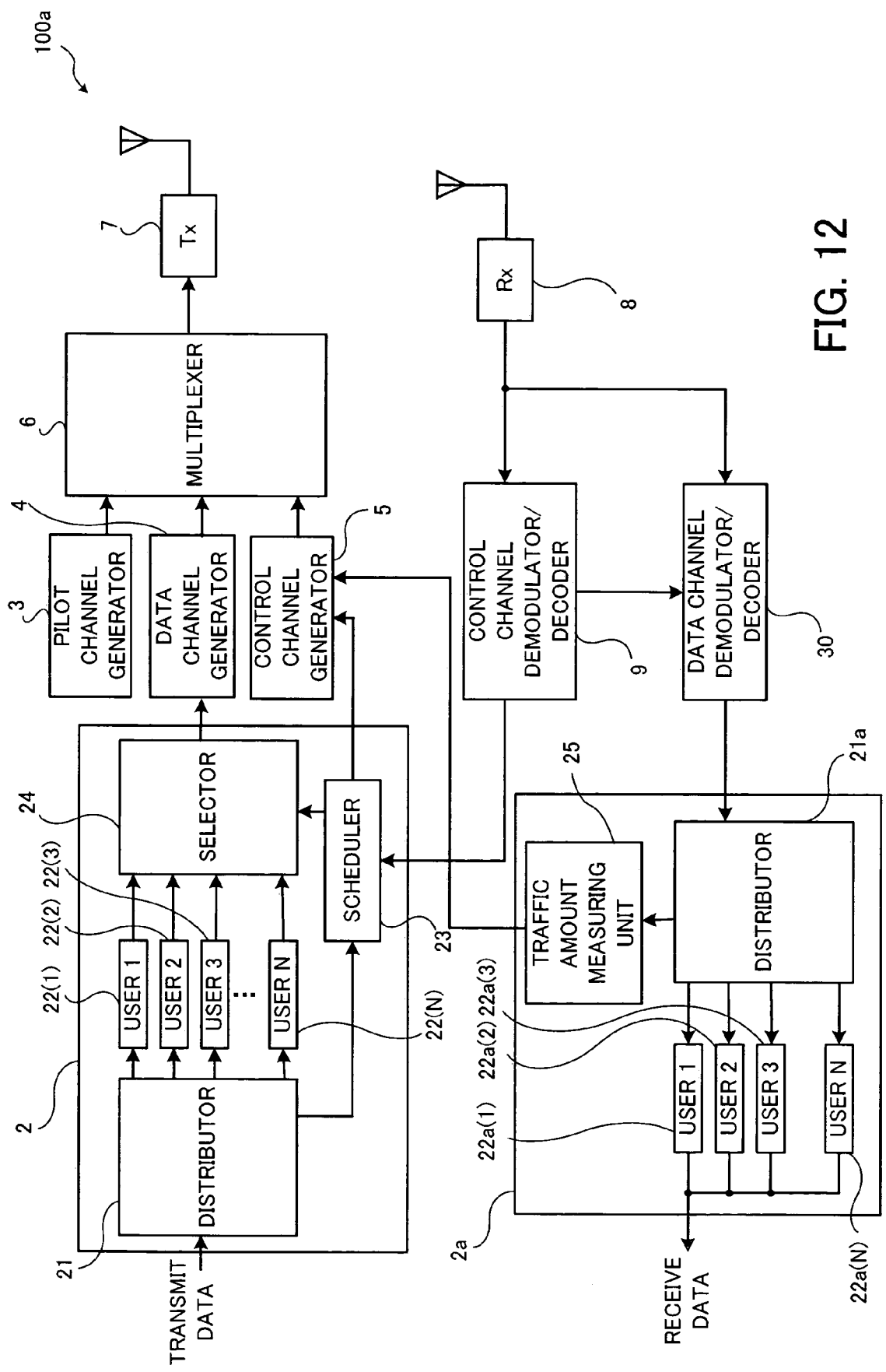
FIG. 12 is a block diagram showing a base station according to a fourth embodiment.

FIG. 12 is a block diagram showing the base station according to the fourth embodiment.

The base station 100a additionally includes an up traffic controller 2a and a data channel demodulator/decoder 30.

The data channel demodulator/decoder 30 demodulates the received data channel to obtain demodulated data.

The up traffic controller 2a includes a distributor 21a, buffers 22a(1), 22a(2), 22a(3), . . . , 22a(N), and a traffic amount measuring unit 25.

The distributor 21a stores the demodulated data in a corresponding one of the buffers 22a(1), 22a(2), 22a(3), . . . , 22a(N) associated with the respective mobile stations (users) (the data is regenerated as a packet associated with the user). The data (receive data) stored in each buffer is transmitted to the network.

The traffic amount measuring unit 25 measures a total traffic amount of the uplink and outputs the result, as a state of use of the uplink, to the control channel generator 5.

The control channel generator 5 generates a control channel including information about the state of use of the uplink.

Figure 13:
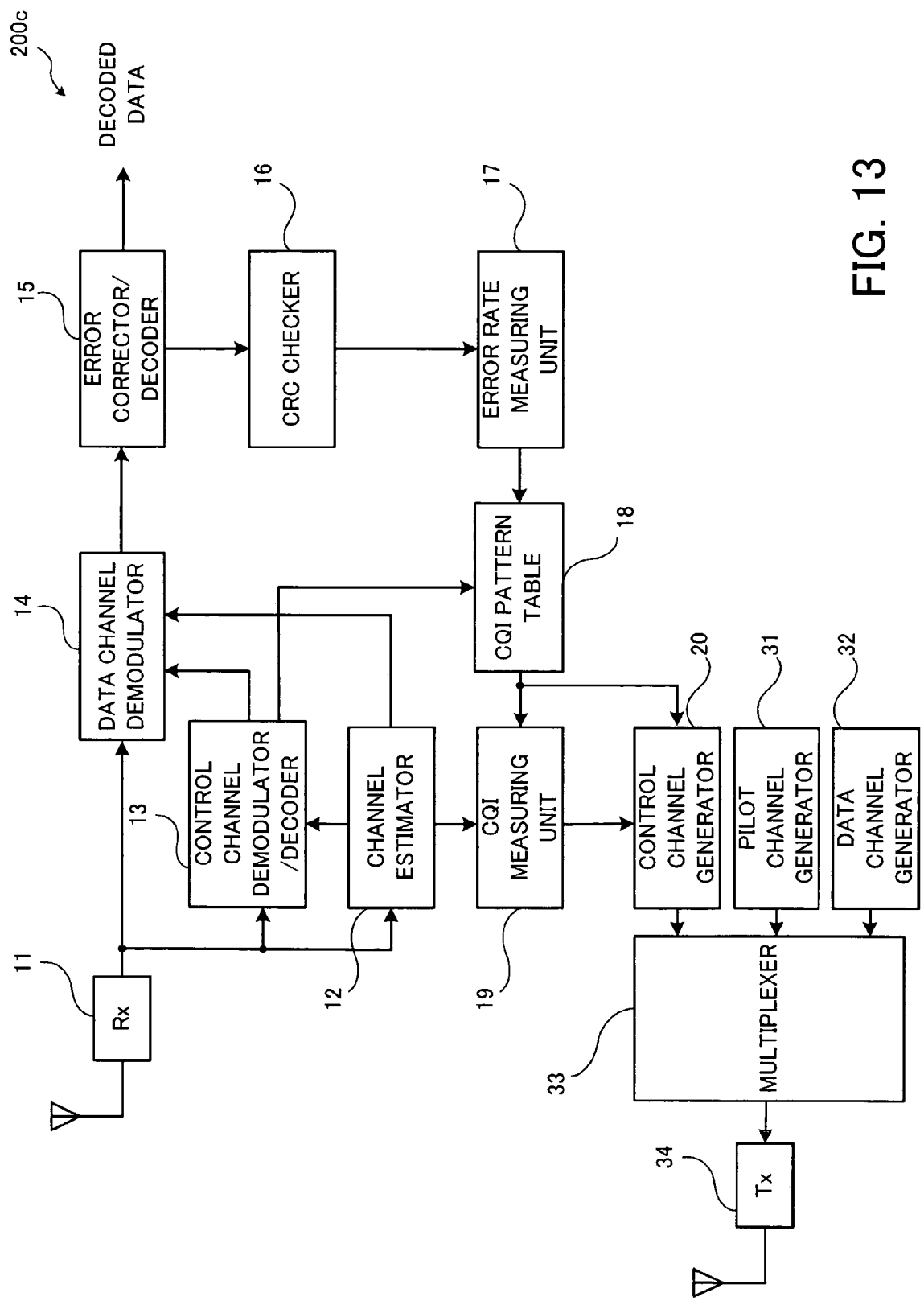
FIG. 13 is a block diagram showing a mobile station according to the fourth embodiment.

FIG. 13 is a block diagram showing the mobile station according to the fourth embodiment.

At the mobile station 200c, the CQI pattern table 18 selects a CQI format in accordance with the information about the state of use of the uplink, notified from the base station 100a via the down control channel. For example, the CQI pattern table 18 is configured in the manner described below. In cases where the state of use of the uplink is well below its capacity, the CQI pattern table selects the CQI pattern 1 if the error rate (communication quality) measured by the error rate measuring unit 17 is higher than or equal to 1%, and selects the CQI pattern 2 if the error rate is lower than 1%. Thus, the threshold for the communication quality is set high, so that the format with a large amount of CQI information is selected with high frequency. On the other hand, where the state of use of the uplink is near its capacity, the CQI pattern table selects the CQI pattern 1 if the error rate (communication quality) measured by the error rate measuring unit 17 is higher than or equal to 5%, and selects the CQI pattern 2 if the error rate is lower than 5%. In this manner, the threshold for the communication quality is set low, whereby the format with a small amount of CQI information is selected with high frequency.

Operation of principal parts of the data transmission system according to the fourth embodiment will be now described.

At the mobile station 200c, the CQI pattern table 18 selects a CQI format in accordance with the information about the state of use of the uplink, notified from the base station 100a via the down control channel.

The up data channel is thereafter received by the receiver (Rx) 8 and sent to the up traffic controller 2a to be regenerated as a packet associated with the user. The traffic amount measuring unit 25 measures the total traffic amount of the uplink, and the measurement result is transmitted via the control channel generator 5 of the downlink to the mobile station 200c as the state of use of the uplink.

The data transmission system of the fourth embodiment can provide the same advantages as those achieved by the data transmission systems of the first and third embodiments.

The uplink data traffic is allocated independently of the downlink data traffic, and this is utilized by the fourth embodiment so that the format with a large amount of CQI information may be frequently used when the uplink traffic is small, thereby improving the downlink throughput.

A data transmission system according to a fifth embodiment will be now described.

The following description is focused on the differences between the data transmission systems of the fifth and first embodiments, and description of the elements and functions common to these two embodiments is omitted.

The data transmission system of the fifth embodiment differs from the counterpart of the first embodiment in that OFDMA is used as the transmission method, and comprises a base station 100b and a mobile station 200d.

Figure 14:
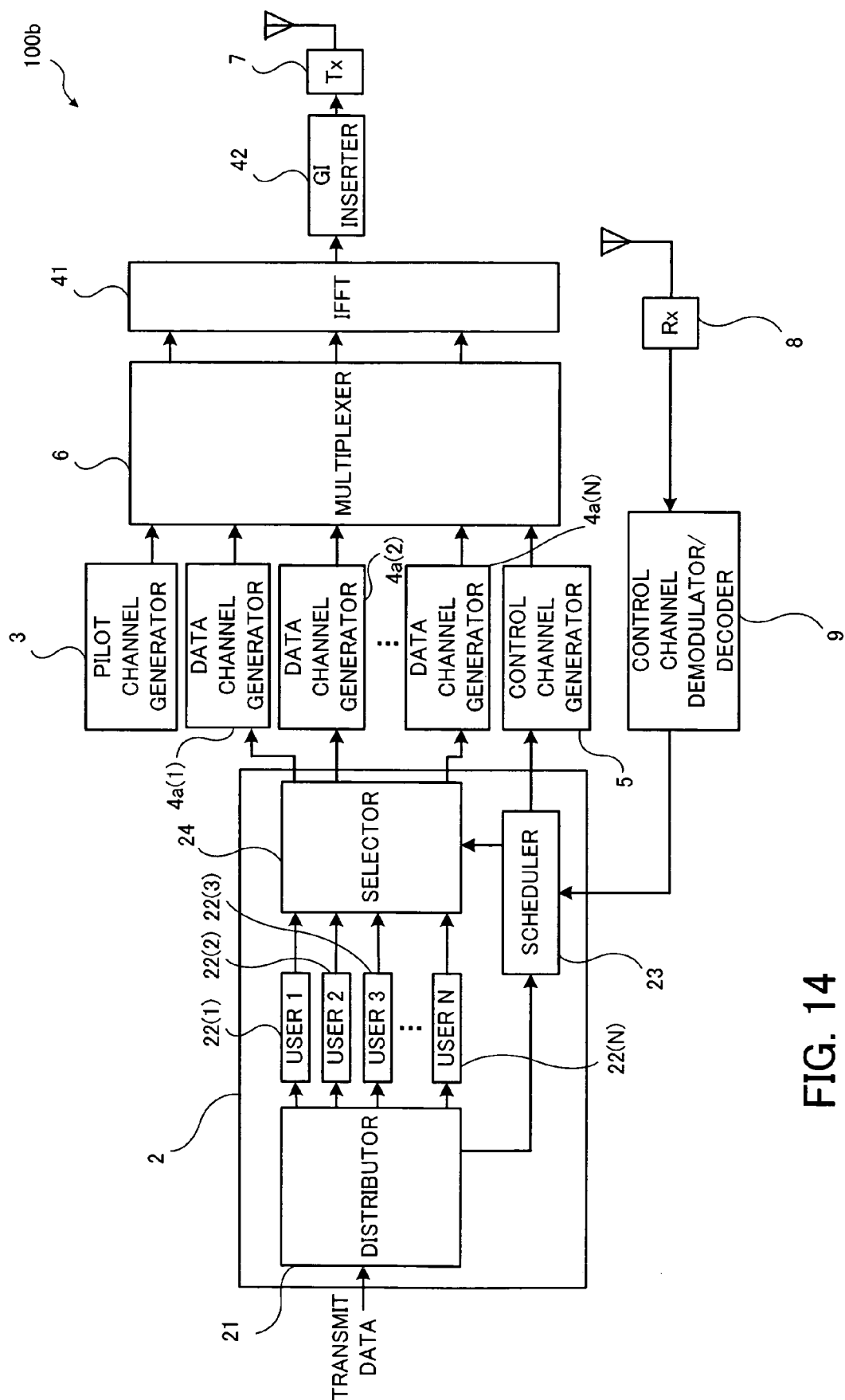
FIG. 14 is a block diagram showing a base station according to a fifth embodiment.

FIG. 14 is a block diagram showing the base station according to the fifth embodiment.

The base station 100b is provided with N data channel generators 4a(1), 4a(2), . . . , 4a(N) for generating N data channels corresponding to frequency blocks, and further with an IFFT (Inverse Fast Fourier Transformer) 41 and a GI inserter 42.

The multiplexer 6 multiplexes the data channels with the pilot and control channels.

The IFFT 41 subjects the multiplexed data to inverse Fourier transform to derive a time domain signal, thus obtaining a packet 500.

Figure 15:
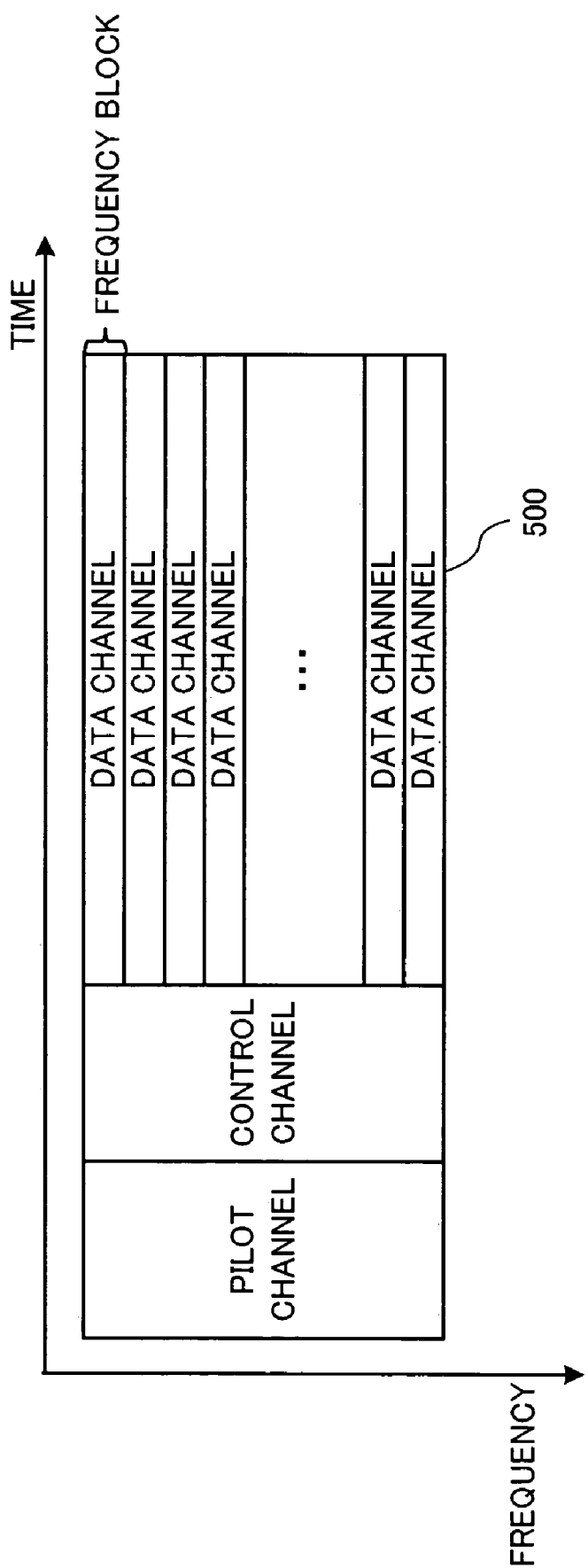
FIG. 15 exemplifies the structure of a packet used in the fifth embodiment.

FIG. 15 exemplifies the structure of the packet generated in the fifth embodiment.

As illustrated, the packet 500 has a structure such that wireless resources are segmented into frequency (subcarrier) blocks and that the data channels are frequency-multiplexed so as to correspond to the respective subcarriers. Also, the data channels are time-multiplexed with the pilot and control channels.

Referring again to FIG. 14, the GI inserter 42 inserts an interval called GI (Guard Interval) into the signal obtained by the inverse Fourier transform. This is a technique generally adopted in OFDM transmission against multipath, and therefore, detailed description thereof is omitted.

Figure 16:
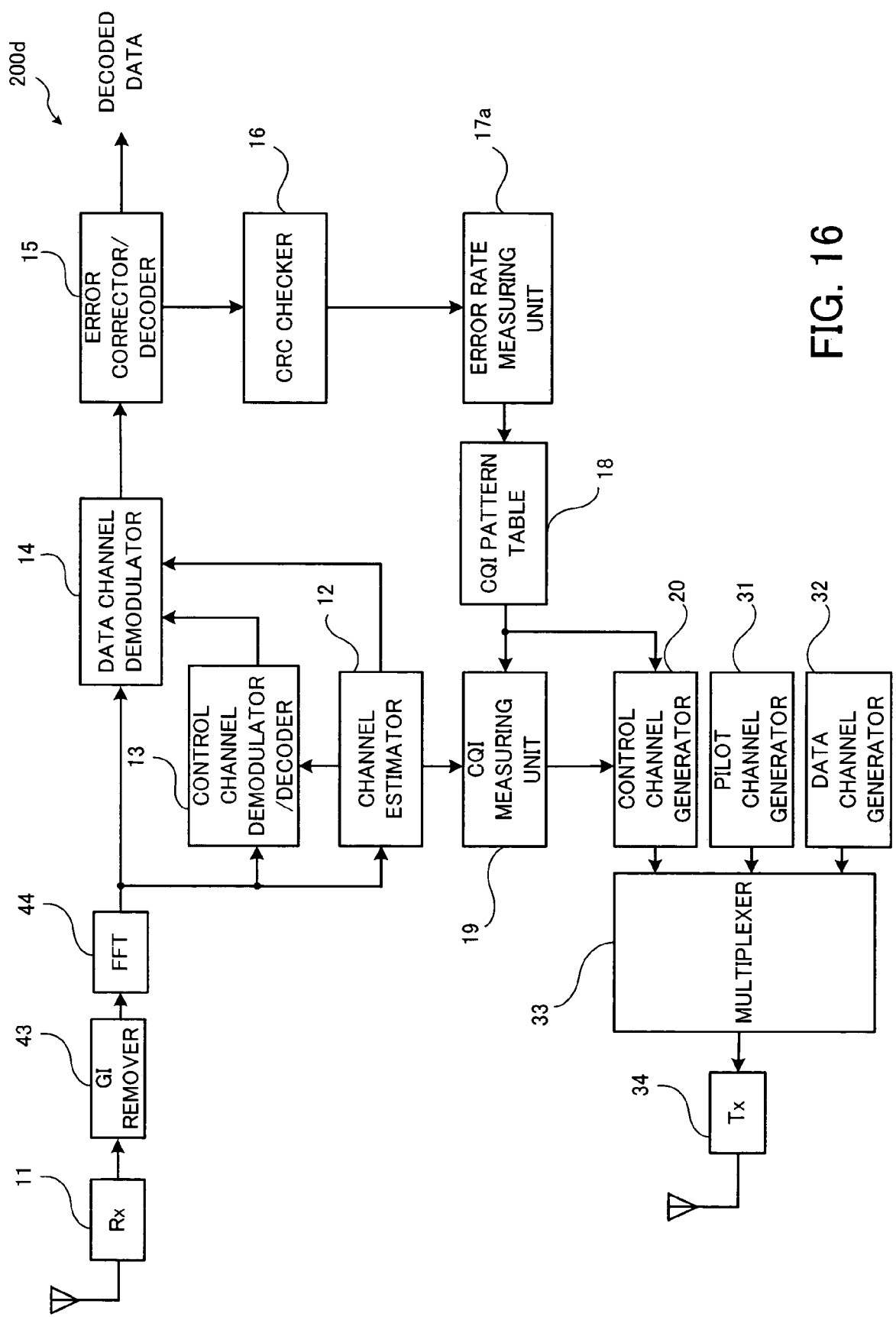
FIG. 16 is a block diagram showing a mobile station according to the fifth embodiment.

FIG. 16 is a block diagram showing the mobile station according to the fifth embodiment.

The mobile station 200*d* further includes a GI remover 43 and an FFT (Fast Fourier Transformer) 44.

The GI remover 43 removes the GI from the signal received via the receiver (Rx) 11.

The FFT 44 subjects the received signal, from which the GI has been removed, to Fourier transform to obtain a packet 500 (frequency domain signal).

In this embodiment, the CQI pattern table 18 varies the number of wireless resource units that one CQI reports, thereby to change the amount of CQI information to be transmitted.

Figure 17:
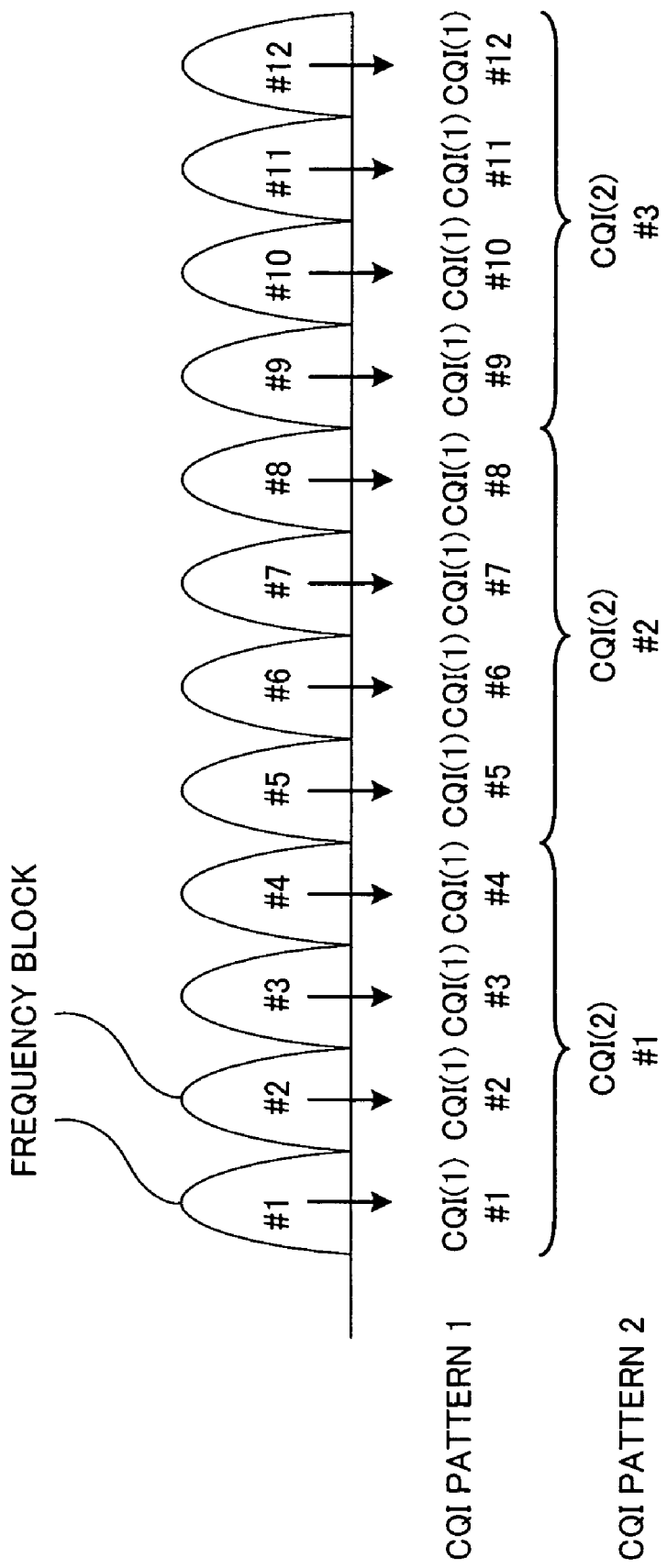
FIG. 17 exemplifies CQI formats used in OFDMA.

FIG. 17 exemplifies CQI formats used in OFDMA, wherein 12 frequency blocks are used for communication, by way of example.

Using the pilot channel of the downlink, the mobile station 200*d* measures the CQI of each frequency block (band). When the communication quality is poor, a format with a large amount of CQI information is selected whereby frequency scheduling can be performed finely with respect to the individual frequency blocks. In the example shown in FIG. 17, the format (CQI pattern 1) containing 12 CQIs (CQI(1)#1 to CQI(1)#12) is selected. On the other hand, when the communication quality is good, a format with a small amount of CQI information is selected so that the frequency scheduling can be performed collectively for multiple bands. In the example shown in FIG. 17, the format (CQI pattern 2) containing three CQIs (CQI(2)#1 to CQI(2)#3), each being an average of four frequency blocks, is selected. Thus, while the communication quality is good, the CQI feedback amount can be significantly reduced. According to this method, while the communication quality is poor, the CQIs are fed back using small wireless resource units so that the highest possible gains may be obtained by the adaptive link control. While the communication quality is good, on the other hand, the CQIs are fed back using coarser wireless resource units than those used when the communication quality is poor, to perform the adaptive link control. In this case, since the communication quality is good, reliable communication is ensured even if the amount of CQI information fed back via the uplink is reduced.

The method for frequency assignment will be explained in detail. The base station 100*b* receives 12 frequency blocks of CQIs from a mobile station 200*d* which is communicating with poor quality, and receives three frequency blocks of CQIs from a mobile station 200*d* which is communicating with good quality. For the mobile station 200*d* which is communicating with poor quality, the base station 100*b* selects, from among the 12 frequency blocks, those frequency blocks whose average CQI is higher than a threshold. For the mobile station 200*d* which is communicating with good quality, the base station 100*b* selects, from among the three frequency blocks, those frequency blocks whose average CQI is higher than the threshold. In cases where the communication quality fluctuates under the influence of phasing or the like in such a manner that the CQIs are fed back irregularly in 12 frequency blocks and in three frequency blocks, the frequency blocks may be assigned depending on which of three and 12 frequency blocks are fed back more frequently. Namely, if 12 frequency blocks are fed back more frequently than three frequency blocks, the frequency blocks may be selected based on the average CQI of the 12 frequency blocks.

Operation of principal parts of the data transmission system according to the fifth embodiment will be now described.

The data channel generators 4*a*(1), 4*a*(2), . . . , 4*a*(N) generate respective data channels, which are then frequency-multiplexed by the IFFT 41. At this time, the pilot and control channels are time-multiplexed with the data channels and transmitted using the whole frequency band. The GI inserter inserts a GI into the signal obtained by the inverse Fourier transform.

At the mobile station 200*d*, the signal from which the GI has been removed is subjected to Fourier transform to convert the received signal to a frequency domain signal, which then undergoes processes including channel estimation, control channel demodulation/decoding, and data channel demodulation.

The data transmission system of the fifth embodiment can provide advantages similar to those achieved by the data transmission system of the first embodiment.

The data transmission system and method according to the present invention provide especially effective means when used in combination with transmission methods wherein a large amount of CQI information is transmitted, such as OFDMA.

Although not depicted by drawings, MIMO multiplex transmission may be used as the transmission method. In the case where MIMO multiplex transmission is used, CQIs measured with respect to multiple transmitting antennas are fed back if the communication quality is poor, and an average of the measured CQIs is fed back if the communication quality is good. By selecting either the CQIs of the individual antennas or the average CQI in this manner, it is possible to generate a CQI pattern with a large amount of information and a CQI pattern with a small amount of information. Thus, the present invention can be implemented using various patterns of CQI formats, and accordingly, suitable CQI formats may be selected in accordance with a target wireless access method to be used so that the control operations may be optimized.

The combination of OFDMA explained in the fifth embodiment with MIMO multiplex transmission also provides a remarkable advantage in that the load on the uplink can be reliably lessened with ease.

While the data transmission system and method according to the present invention have been described with reference to the various embodiments illustrated in the drawings, it should be noted that the present invention is not limited to these embodiments alone. For example, the individual elements may be replaced with desired elements having similar functions. Also, the present invention may be additionally provided with other desired elements and processes.

Further, the present invention may be implemented by combining optional two or more of the constructions (features) of the foregoing embodiments. For example, the system and the method may be configured so that most suitable wireless resources may be selected and controlled in accordance with communication conditions.

Also, the CQI formats to be used in the present invention are not limited to two patterns, and three or more patterns of CQI formats may be determined beforehand.

Although the foregoing embodiments are explained with reference to the system configuration including one base station and one mobile station, the configuration to which the present invention can be applied is of course not limited to such a configuration.

Further, in the foregoing embodiments, the CQI pattern table 18 is used to select a CQI format in accordance with the communication quality information, but calibration curves, numerical formulas, etc. may be used instead.

According to the present invention, the amount of CQI information is varied by changing the CQI format in accordance with the communication quality of the packet transmitted from the first transmitter, and thus, the load on the uplink can be lessened.

This advantage is especially noticeable in cases where the invention is applied to packet transmission/reception techniques in which a relatively large amount of CQI information is transmitted, like OFDMA.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transmission system for exchanging packets each including a data channel, comprising:
    a transmitting station including a controller for controlling packet communication quality in accordance with a channel quality indicator (CQI) indicative of quality of a packet propagation path so that the packet communication quality may become highest, a packet generator for generating a packet, and a first transmitter for transmitting the packet; and
    a receiving station including a receiver for receiving the packet, a format changer for changing a CQI format that specifies how many bits to use to represent CQI information in each feedback to the transmitting station, in accordance with communication quality of the received packet with respect to a threshold thereof, a measuring unit for measuring the CQI based on the CQI format, and a second transmitter for transmitting the measured CQI to the transmitting station;
    wherein the receiving station adjusts the threshold of the communication quality for changing the CQI format, in accordance with a state of occupancy of the propagation path from the receiving station to the transmitting station notified from the transmitting station via a downlink control channel.

2. The data transmission system according to claim 1, wherein the packet is generated using at least one of time-, frequency- and space-based units into which wireless resources are segmented, and
    wherein the CQI format is a format based on the units into which the wireless resources are segmented.

3. The data transmission system according to claim 2, wherein, where the packet is generated using two or more of the time-, frequency- and space-based units into which the wireless resources are segmented, the controller selects one of the wireless resources in accordance with communication conditions.

4. The data transmission system according to claim 1, wherein, where retransmission control is performed in conjunction with transmission of the packet, the receiving station determines the communication quality in accordance with a retransmission count of the packet.

5. The data transmission system according to claim 1, wherein the packet communication quality is chiefly indicative of communication quality of the packet transmitted from the transmitting station to the receiving station.

6. The data transmission system according to claim 1, wherein information on the packet communication quality is held by the data channel.

7. The data transmission system according to claim 1, wherein the format changer reduces the number of bits representing the CQI information when the packet communication quality has increased, and raises the number of bits representing the CQI information when the packet communication quality has decreased.

8. The data transmission system according to claim 7, wherein the packet is generated using at least one of time-, frequency- and space-based units into which wireless resources are segmented, and
    wherein, when the packet communication quality has increased, the format changer changes the CQI format to a format in which CQI information is represented with coarser segmentation units of the wireless resources.

9. The data transmission system according to claim 7, wherein the receiving station further includes calculating means for calculating an evaluation range and evaluation level evaluating the quality of the propagation path indicated by the CQI, and
    wherein, when the packet communication has increased, the format changer changes the CQI format to a format in which CQI information is represented with a coarser resolution of the evaluation range and/or evaluation level.

10. The data transmission system according to claim 1, wherein information on the packet communication quality is previously sent from the receiving station to the transmitting station.

11. The data transmission system according to claim 1, wherein the receiving station transmits information on the CQI format being used, along with the CQI format, to the transmitting station.

12. A data transmission method for exchanging packets each including a data channel, comprising:
    controlling, at a transmitting station, packet communication quality in accordance with a channel quality indicator (CQI) indicative of quality of a packet propagation path so that the packet communication quality may become highest;
    transmitting a packet from the transmitting station to a receiving station;
    receiving the transmitted packet at the receiving station;
    adjusting, at the receiving station, a threshold of the communication quality in accordance with a state of occupancy of the propagation path from the receiving station to the transmitting station notified from the transmitting station via a downlink control channel;
    changing, at the receiving station, a CQI format that specifies how many bits to use to represent CQI information in each feedback to the transmitting station, in accordance with communication quality of the received packet with respect to the adjusted threshold;

measuring, at the receiving station, the CQI based on the CQI format; and transmitting the measured CQI from the receiving station to the transmitting station.

\* \* \* \* \*